Aug. 17, 1948.    A. E. GERRITS ET AL    2,447,327
ABRASIVE TOOL
Filed March 20, 1947    2 Sheets-Sheet 1
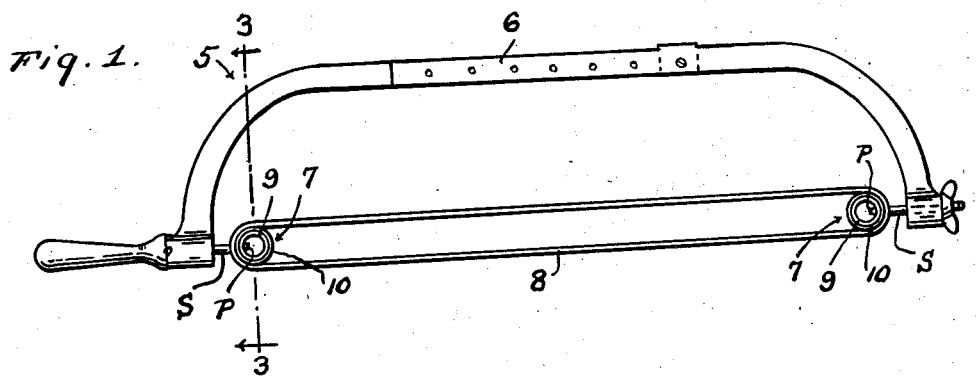
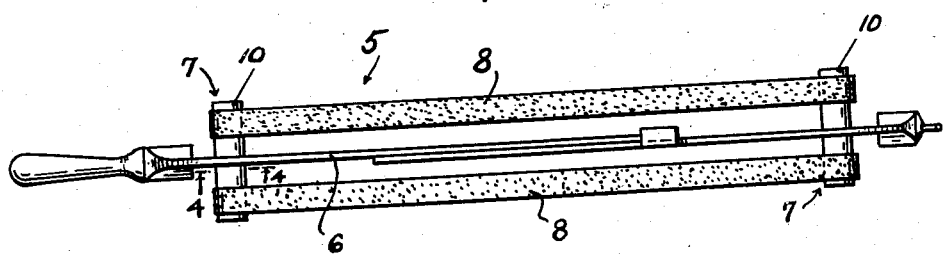
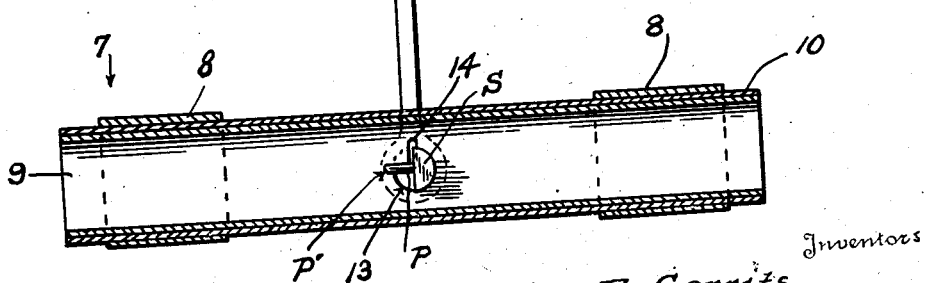
Inventors
Adrian E. Gerrits &
Harvey E. Gygi
By L. B. James
Attorney Aug. 17, 1948.    A. E. GERRITS ET AL    2,447,327
ABRASIVE TOOL Filed March 20, 1947    2 Sheets-Sheet 2

Inventors
Adrian E. Gerrits &
Harvey E. Gygi
By L. B. James
Attorney

Patented Aug. 17, 1948

2,447,327

UNITED STATES PATENT OFFICE 2,447,327

ABRASIVE TOOL

Adrian E. Gerrits and Harvey E. Gygi, Appleton, Wis.

Application March 20, 1947, Serial No. 735,879

2 Claims. (Cl. 51—186)

This invention relates to abrasive tools and more particularly means whereby those conventional saws, such as hack saws, jeweler's saws, coping saws, buck saws and the like having replaceable saw blades, are converted into abrasive or polishing tools without destroying their initial utility or subsequent use for which they were designed.

The primary object of this invention resides in substituting, without alteration, adaptors for the saw blades of hack saws and the like so as to extend their utility of the frames or supports therefor to retaining abrasive, burnishing, polishing or other similar elements for application to elements mounted on lathes or otherwise moved by machinery or hand.

Another object of this invention resides in the provision of adaptors for the frames of hack saws and the like adapted to be removably secured to the frames by the saw blade securing means thereof, without alteration, so as to accommodate belts of abrasive, polishing or other similar material.

A further object of this invention resides in the provision of means whereby hack saws, jeweler's saws, coping saws, buck saws and the like are converted into abrasive, burnishing and polishing tools so as to permit more efficient operation of the abrasive material to the work being operated on with the factor of safety to the operator materially enhanced.

A still further object of this invention resides in the combination of a saw frame and adaptors for retaining work engaging material thereon.

Aside from the aforesaid objects, this invention resides in the particular construction of the adaptors.

With these and other objects in view, this invention resides in certain novel features of construction and combination of elements to be hereinafter more particularly set forth in the specification, illustrated in the accompanying drawings and, although the present disclosure depicts our present conception of the invention, the right is reserved to resort to such departures therefrom as come within the spirit of the invention.

In the accompanying drawings forming a part of this application;

Fig. 1 is a side view of the abrasive tool.

Fig. 2 is a plan view thereof.

Fig. 3 is an enlarged sectional view taken approximately on line 3—3 of Fig. 1.

Figure 4:
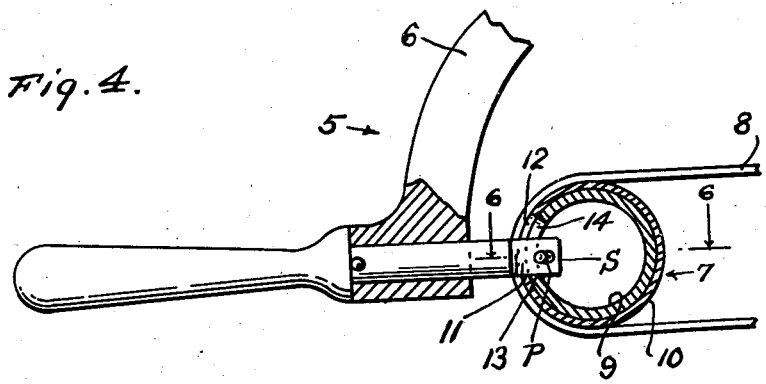
Fig. 4 is an enlarged sectional view taken approximately on line 4—4 of Fig. 2.
Figure 5:
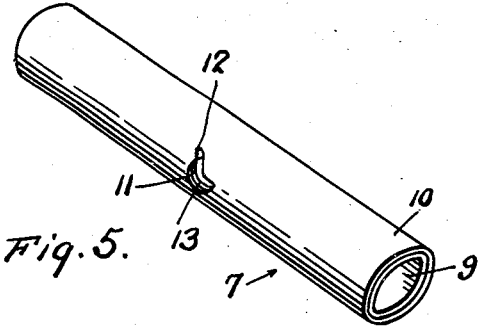
Fig. 5 is a perspective view of one of the adaptors.
Figure 6:
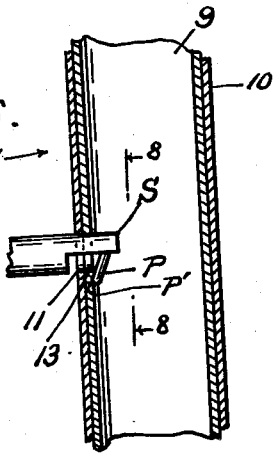
Figure 6 is an enlarged fragmentary view of an adaptor mounted upon its supporting stud.
Figure 7:
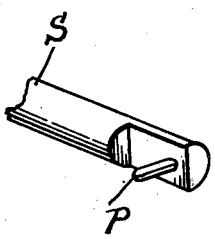
Figure 7 is an enlarged fragmentary view of the supporting stud.
Figure 8:
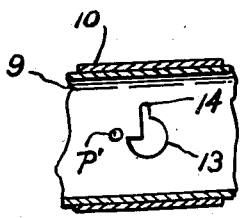
Figure 8 is an enlarged fragmentary view of the adaptor showing the hole for receiving a supporting stud.

In the present illustration of this invention, the numeral 5 designates, in general, an abrasive tool consisting of a substantially inverted U-shape frame 6 originally designed for supporting hack saw blades and herein employed, without alterations, to accommodate adaptors 7 over which are trained endless abrasive or other forms of belts 8 for application against work rotated by lathes or otherwise moved thereagainst, it being within the purview of this invention to so alter the connecting means of the adaptors that they can readily be removably secured to the conventional saw fastening means of all types of saw frames or supports having replaceable blades.

The adaptors 7 herein disclosed consist of elongated cylindrical shells 9, having their peripheries covered by rubber or other suitable linings 10 which are herein shown as provided with holes and slots 11 and 12 at their medial points registered with a similarly shaped holes and slots 13 and 14 in the shells so as to accommodate saw blade securing studs S and pins P carried by the saw frame and thereby retain the adaptors in removable adjustable relation to the frame. Although the adaptors herein disclosed are of cylindrical configuration, they may be of such other shapes as are required in practicing the invention.

In the present disclosure the adaptors 7 are shown as supporting an abrasive belt on opposite sides of their securing studs S, however, the adaptors may be of such lengths as will accommodate a plurality of belts having elected grades of abrasive, burnishing or polishing material thereon.

Where belts having different grades of abrasive, burnishing or polishing materials affixed thereto are used, the same are preferably arranged on the adaptors to successively operate over the work according to the grade of material thereon, that is, the belt having coarse material thereon will lead those of graded finer materials, however, application and operation of the belts is optional with the mechanic.

Where this invention is to be practiced with a jig saw blade thereof is removed and replaced by the adaptors 7 to accommodate the aforesaid belts and with such arrangement or application of the invention, the work is placed against the reciprocating belts by the mechanic or any type of machine element holding the same.

With this invention fully set forth, it is manifest that means are provided whereby the frames and supports of removable saw blades are adapted to be utilized, without alterations, in supporting abrasive, burnishing and polishing elements and, through the instrumentality of the conventional saw blade adjusting means carried by the frames, tension of the abrasive or other work contacting elements may be regulated to meet requirements in performing work on different materials.

Having thus described our invention, what we claim and desire to protect by Letters Patent is:

1. The combination with a substantially inverted U-shaped frame having aligned openings through the end portions thereof, opposed adaptors having openings therethrough at their medial points and in alignment with the openings in the ends of the frame, fasteneing elements slidably extending through the openings in the ends of the frame with their inner ends extending through the openings in the adaptors and their outer ends extending outwardly of the ends of the frame, pins on the inner ends of the fasteners having their free ends seated in depressions in the inner peripheries of the adaptors, a handle secured to the outer end of one of the fasteners, a thumb-nut threadedly screwed on the outer end of the other fastener, and laterally spaced endless belts trained over the outer portions of the adaptors on opposite sides of their fastening elements.

2. The combination with a substantially U-shaped frame, elongated cylindrical adaptors having rubber linings on their outer peripheries, means removably and adjustably connecting the adaptors at their medial points crosswise of the frame, and laterally spaced work engaging elements supported by the adaptors on opposite sides of their medial points.

ADRIAN E. GERRITS.
HARVEY E. GYGI.

REFERENCES CITED

The following references are of record in the file of this patent:

UNITED STATES PATENTS

| Number | Name | Date |
|---|---|---|
| 470,779 | Calef | Mar. 15, 1892 |
| 1,043,405 | Dagenais | Nov. 5, 1912 |
| 1,365,583 | Brown | Jan. 11, 1921 |
| 2,080,345 | Stovall | May 11, 1937 |
| 2,115,812 | Hardy | May 3, 1938 |

FOREIGN PATENTS

| Number | Country | Date |
|---|---|---|
| 245,478 | Italy | Jan. 16, 1926 |
| 714,431 | France | Sept. 7, 1931 |
| 813,206 | France | Feb. 22, 1937 |